United States Patent [19]
Levy et al.

[11] Patent Number: 5,155,586
[45] Date of Patent: Oct. 13, 1992

[54] METHOD AND APPARATUS FOR FLARE CORRECTION

[75] Inventors: Yoram Levy, Palo Alto; David O. Hodgson, San Mateo, both of Calif.

[73] Assignee: Sony Corporation of America, Park Ridge, N.J.

[21] Appl. No.: 746,928

[22] Filed: Aug. 19, 1991

[51] Int. Cl.$^5$ .......................... H04N 3/36; H04N 9/11
[52] U.S. Cl. .......................... 358/54; 358/27
[58] Field of Search .............. 358/54, 214, 39, 27, 358/163, 174

[56] References Cited

U.S. PATENT DOCUMENTS 4,410,908 10/1983 Belmares-Sarabia et al. .... 358/54 X
4,866,511 9/1989 Belmares-Sarabia et al. ........ 358/27

OTHER PUBLICATIONS

P. Swinson, R. Cintel, "URSA", *International Broadcast Engineer*, pp. 100–102.
L. J. D'Luna, K. A. Parulski, D. C. Maslyn, M. A. Hadley et al., "A Digital Video Signal Post-Processor for Color Image Sensors", *IEEE 1989 Custom Integrated Circuits Conference*, 1989, pp. 24.2.1–24.2.4.
R. Dean (reports), "Telecine—The State of the Manufacturers", *Equipment Focus*, 3 pages in length.
Brochure Entitled "DaVinci Unified Color Correction System", *Dynatech Broadcast Group Limited*, Oct. 1987, 8 pages in length.

*Primary Examiner*—James J. Groody
*Assistant Examiner*—Mark R. Powell
*Attorney, Agent, or Firm*—Limbach & Limbach

[57] ABSTRACT

A method and system for digitally performing flare correction on digitized color film images. Each digitized image may include a red data stream, a blue data stream, and a green data stream collectively corresponding to a digitized color image (or frame). The system of the invention digitally generates flare correction signals, and employs the flare correction signals to compensate for undesired luminance variations from frame to frame within each color channel. In a preferred embodiment, the system also generates lift variation correction signals, and employs these signals to achieve a desired balance between the color channels. In one embodiment, the invention generates digitized color film images from a motion picture film, and digitally performs flare correction on the digitized images to correct for changes in the average luminance of consecutive images, and lift correction to achieve a desired balance between red, blue, and green color channels. Additional processing operations, such as color correction, are then performed digitally on the corrected digitized images.

28 Claims, 11 Drawing Sheets

METHOD AND APPARATUS FOR FLARE CORRECTION

FIELD OF THE INVENTION

The invention is a method and apparatus for digitally performing flare correction on digitized color film images. The invention is suitable for use in a system for generating digitized color film images from motion picture film, to perform flare correction on the digitized images in order to compensate for changes in the average luminance of consecutive digitized images.

BACKGROUND OF THE INVENTION

Conventional motion picture film comprises frames that are commonly displayed sequentially at a frame rate of 24 frames per second (24 fps), or 30 fps, or some other rate. Required special effects may embodied in the displayed film.

Systems (including "telecine" systems) have been developed for converting motion picture film into video signals. These systems generate a video signal from motion picture film images by scanning the film frames sequentially to generate digitized film images. They then convert the digitized images into a video signal having a standard video frame rate (25 video frames per second for PAL video, 29.97 video frames per second for NTSC video, or 30 video frames per second for SMPTE-240M high definition video). Each video frame consists of two fields.

The average luminance level of scanned film images (obtained by scanning motion picture film frames) often undesirably varies from frame to frame due to optical scatter in the lens assembly of the scanning video camera. Some systems for converting motion picture film into video have implemented "flare correction" algorithms to smooth undesired luminance variation between consecutive frames. Conventional flare correction is performed after the film is scanned, but before the scanned analog images are digitized, by applying a lift correction signal to the scanned analog images. The lift correction signal is typically generated as follows. A black reference object is scanned and the average luminance level (an analog voltage) of the resulting analog image is measured. Then, a contrasting object is scanned (typically a white rectangle on a black background) and the average luminance level of the resulting analog image is measured. The lift correction signal is generated to be proportional to the difference between the two measured "average luminance" voltages.

Conventional systems for implementing flare correction typically employ a capacitative integrator to detect analog luminance levels, and then generate a flare correction signal from the output of the capacitative integrator. Due to use of an integrator, this class of conventional analog implementations imposes a significant time delay on the signal being processed.

Until the present invention, no practical technique for digitally implementing flare correction had been developed.

SUMMARY OF THE INVENTION

The invention is a method and system for digitally performing flare correction on digitized color film images. The digitized images may comprise frames of a digital video signal, with a red frame, a blue frame, and a green frame collectively corresponding to a digitized color image.

The system of the invention digitally generates flare correction factor signals, and employs the flare correction factor signals to compensate for undesired luminance variations from frame to frame within each color channel. In a preferred embodiment, the inventive system also generates lift variation correction signals, and employs these signals to achieve a desired balance between the system's red, green, and blue data channels.

In one embodiment, the system of the invention includes means for generating digitized color film images from motion picture film, and for digitally performing flare correction on the digitized images to correct for changes in the average luminance of consecutive images. The system is capable also of performing additional digital signal processing operations, such as color correction, on the corrected digitized images.

DETAILED DESCRIPTION OF THE PREFERRED EMBODIMENT

Figure 1:
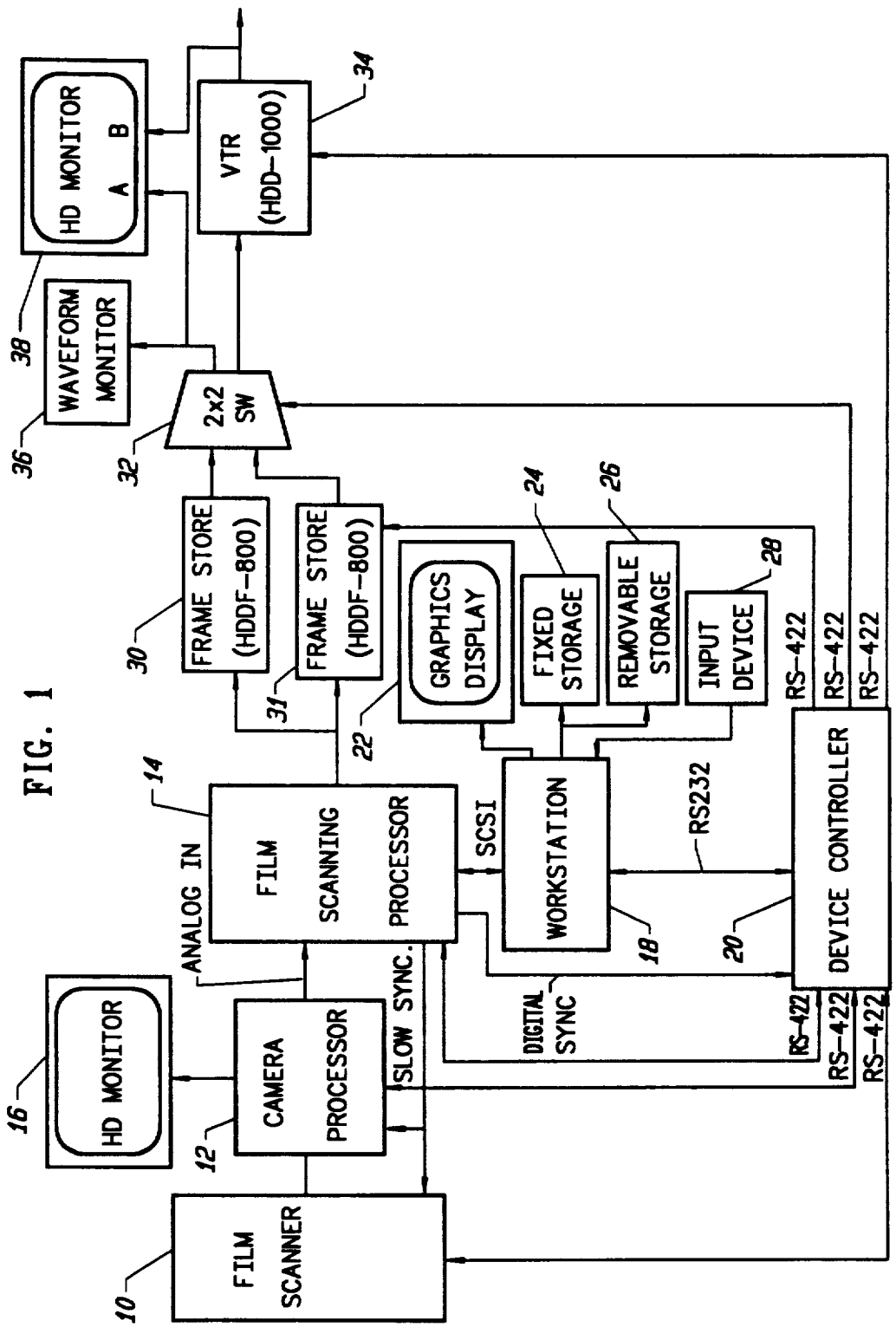
FIG. 1 is a block diagram of a film to video conversion system, in which the invention may be embodied.

The apparatus of the invention can be embodied in the apparatus disclosed in each of the following patent applications, each assigned to the assignee of the present application: "Non-Real-Time Film Scanning System," by P. Capitant, D. Hodgson, and V. Perry, filed Aug. 7, 1991, Ser. No. 741,329; "Digital Color Correction System and Method," by P. Capitant, V. Perry, and K. Swamy, filed Jun. 5, 1991, Ser. No. 710,704; "Digital Video Color Processor with Anti-Aliasing Filter," by D. Hodgson, filed Aug. 5, 1991, Ser. No. 740,623; "Film-to-Video Frame Image Conversion Apparatus and Method for Selectively Identifying Video Fields and Frames," by P. Capitant, D. Hodgson and V. Perry, filed May 14, 1991, Ser. No. 699,928; "Digitized Film Image Processing System with Bordered Split Screen Display," by P. Capitant, D. Hodgson, and V. Perry, filed Aug. 5, 1991, Ser. No. 740,626; and "Digital Video Processing System with Mixer Prefilter," by D. Hodgson, filed Jul. 25, 1991, Ser. No. 736,006. The specification of each listed application is incorporated herein by reference.

We contemplate that the invention may be embodied in a film scanning and processing system of the type shown in FIGS. 1-3 and 5-9. The system of FIG. 1 includes film scanner 10 and camera processor 12. Film scanner 10 transports motion picture film (color, or black and white) past camera processor 12, which includes a video camera and related analog video signal processing circuitry. Camera processor 12 images each film frame adjacent to it, and generates an analog signal representing each film frame.

In a preferred embodiment, the motion picture film is imaged by camera processor 12 at a rate of 1.875 frames per second ("1.875 fps"), as scanner 10 transports the film past camera processor 12 at that rate (1.875 fps). Camera processor 12 preferably generates analog high definition video signals, such as analog high definition video signals having SMPTE-240M format.

The analog output of camera processor 12 is supplied to film scanning processor 14, and is optionally also displayed on monitor 16. Within film scanning processor 14, the analog video signals from camera processor 12 are digitized, and various digital signal processing operations (to be discussed in detail below with reference to FIGS. 2-6) are performed on the digitized video data. The flare correction method of the invention is preferably implemented by circuitry (to be discussed in detail below with reference to FIGS. 4 and 4A) within processor 14. Color correction will typically also be performed by circuitry (to be discussed in detail below with reference to FIG. 6) within processor 14.

Computer 18 interfaces with, and controls processor 14 and device controller 20. In response to user commands sent from computer input device 28 to computer 18, computer 18 instructs processor 14 to perform signal processing operations selected by the user, and computer 18 instructs controller 20 to send user-selected control signals to processor 12, scanner 10, frame storage units 30 and 31, 2×2 switch 32, and video recording and playback unit 34.

In a preferred embodiment, computer 18 is a workstation (such as a NEWS 1850 workstation, available from Sony Corporation) connected by an SCSI interface to processor 14, computer 18 is connected by an RS232 interface to controller 20, and computer 18 is connected by an RS422 interface to processor 12, scanner 10, frame storage units 30 and 31, switch 32, and video recording and playback unit 34. In one preferred embodiment, units 30 and 31 are Model HDDF-500 high definition video frame store units available from Sony Corporation, and recording and playback unit 34 is a Model HDD-1000 high definition video recorder available from Sony Corporation.

Also connected to computer 18 are fixed data storage means 24 (which may be a hard disk drive) and removable data storage means 26 (which may be a floppy disk drive), and graphics display 22 (preferably, a high resolution color graphics display).

Preferably, computer input device 28 includes a touch tablet for finger selection of menu items and icons displayed on monitor 22, a trackball for selecting color and image areas displayed on monitor 22, and a keyboard for entering text, user notes, and processing parameters.

After the digitized video data are processed digitally in processor 14, the processed data are stored on a frame-by-frame basis in frame stores 30 and 31. Switch 32, under control of controller 20, connects desired ones of frame stores 30 and 31 to video recording and playback unit 34 and to waveform monitor 36 and video monitor 38 (which is preferably a high definition video monitor). To maximize the system's throughput rate, as a frame of data is read out (or a set of frames are read out) from one of frame stores 30 and 31, the next frame (or set of frames) of data should simultaneously be written into the other one of frame stores 30 and 31. In such an operating mode, switch 32 connects alternating ones of frame stores 30 and 31 to unit 34 (and optionally also to monitors 36 and 38).

Figure 2:
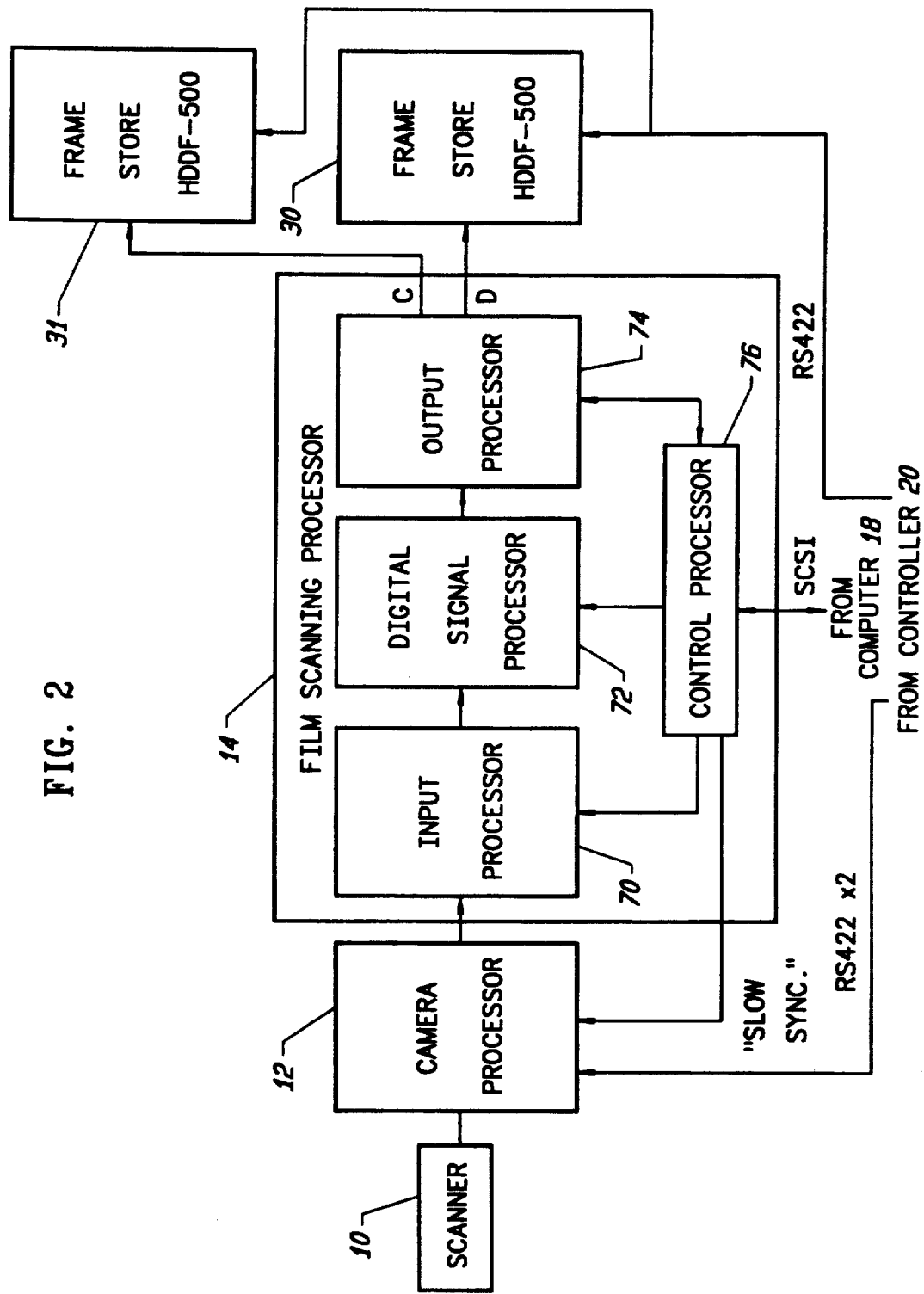
FIG. 2 is a block diagram of a portion of the FIG. 1 system.

The preferred embodiment of film scanning processor 14 shown in FIG. 2 includes input processor 70 (which receives the analog output of camera processor 70), digital signal processor 72, output processor 74, and control processor 76. Input processor 70 digitizes the analog input signal, performs preliminary corrections on the resulting digitized data, and supplies the preliminarily processed digitized data to digital signal processor 72 for color correction. The color corrected data generated in processor 72 are supplied through output processor 74 to frame stores 30 and 31. Processors 70, 72, and 74 operate under control of control processor 76, which in turn receives instructions from computer 18 over an SCSI interface.

In one class of embodiments, control processor 76 generates a synchronization signal for reading out (discharging) an image sensor means within camera processor 12. Preferably, the image sensor means is read out at a low rate (such as 1.875 fps) in response to a correspondingly low rate synchronization signal ("slow sync") from processor 76.

Figure 3:
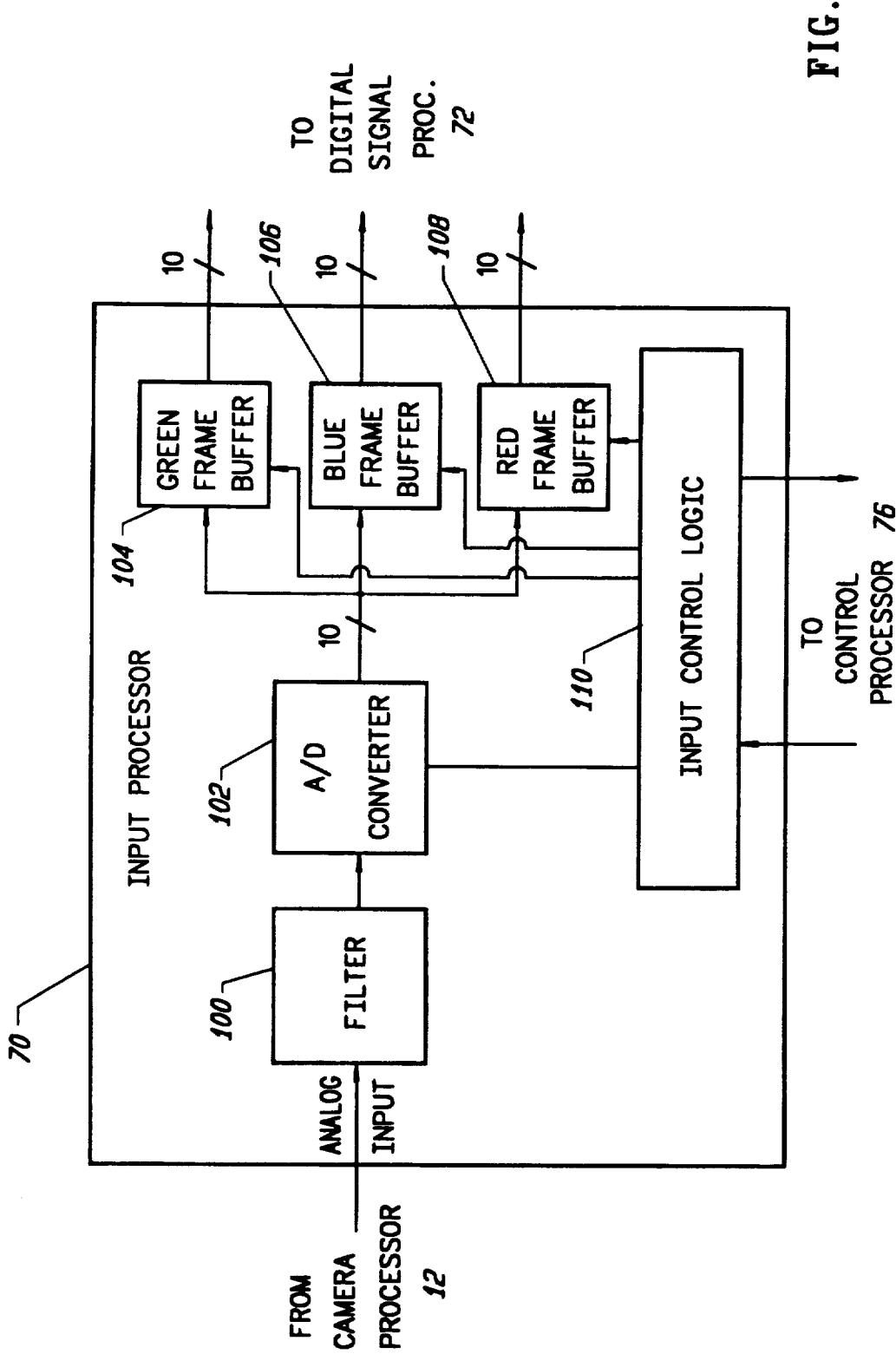
FIG. 3 is a block diagram of the input processor shown in FIG. 2.

A preferred embodiment of input processor 70 is shown in FIG. 3. The analog input signal supplied to processor 70 consists of frames, each comprising 2200×1125 pixels. Of the 2200 pixels per line, there are 1920 pixels of active video and 280 pixels which comprise a horizontal blanking interval. Each frame consists of 1125 lines, including lines representing an even field and an odd field, and ninety lines which comprise vertical blanking intervals. The vertical blanking intervals contain synchronization information.

The analog input signal is supplied from camera processor 12 (preferably over a 75 ohm coax cable) to filter/amplifier circuit 100. Circuit 100 includes an amplifier for amplifying the analog input signal, circuitry for separating the sync and video portions of the input signal, and a low pass filter for filtering the video portion of the input signal to enhance resolution during digitization. In one embodiment, the cutoff frequency of the low pass filter within circuit 100 is about 7.5 MHz, with the filter having a flat frequency response from 0 to 7.5 MHz, and the frequency response of the filter declining in a steep slope from 7.5 MHz to 9.3 MHz.

The amplified, low-pass-filtered analog output from filter 100 is digitized in analog-to-digital conversion circuit 102. In a preferred embodiment, circuit 102 implements 10-bit quantization, in which case the digital data generated by circuit 102 will comprise ten parallel digital data streams. In order to perform 10-bit quantization with a relatively simple, inexpensive analog-to-digital conversion circuit 102, we prefer that the output frame rate of camera processor 12 should equal 1.875 fps. When the output frame rate of camera processor 12 is 1.875 fps, the digital data emerging from circuit 102 has a data rate of 18.56 MHz (one fourth the proposed real-time SMPTE-240M high definition digital video clock rate, 74.25 MHz).

The digital video data generated by A/D converter 102 are supplied to green frame buffer 104, blue frame buffer 106, and red frame buffer 108. The output of camera processor 12 is time division multiplexed, typically in the following sequence: two fields of blue data, then two fields of green data, then two fields of red data, and finally two fields of gray data. Input control logic circuitry 110 (operating under control of control processor 76) causes frames of blue digital data ("$B_{in}$"), green digital data ("$G_{in}$"), and red digital data ("$R_{in}$") from A-to-D converter 102 to be written sequentially (on a frame-by-frame basis) into buffer 106, then into buffer 104, and next into buffer 108. The gray frames are not normally written into any of buffers 104, 106, and 108.

Blue, green, and red data are written sequentially into buffers 104, 106, and 108 at the source rate (typically, 1.875 frames per second). Blue, green, and red data are read out in parallel from buffers 104, 106, and 108 (to produce three parallel data streams, each representing a different 10-bit color channel) at four times the source rate. Thus, each color channel output from buffers 104, 106, and 108 typically has a frame rate of 7.5 frames per second (one fourth of the proposed standard SMPTE-240M video frame rate). In order to achieve the described four-fold increase in frame rate, each bit written into one of buffers 104, 106, and 108, is read out four times from that buffer.

Preferably, each of buffers 104, 106, and 108 is a double buffer, including a first memory, and a second memory into which data can be written while data (previously written into the first memory) is read from the first memory.

As mentioned, the gray frames are not normally written into any of buffers 104, 106, and 108. However, in one class of embodiments, the system has an optional operating mode in which gray frames are read from input processor 70 at four times the source rate at which they are supplied to processor 70. In one such embodiment, a double gray frame buffer is connected in parallel with buffers 104, 106, and 108. One memory within the double gray frame buffer is filled while the other memory therein is read (at four times the source rate) to processor 72. In another of such embodiments, the gray frames (rather than the red, green, and blue frames) are read into one or more of buffers 104, 106, and 108.

Figure 4:
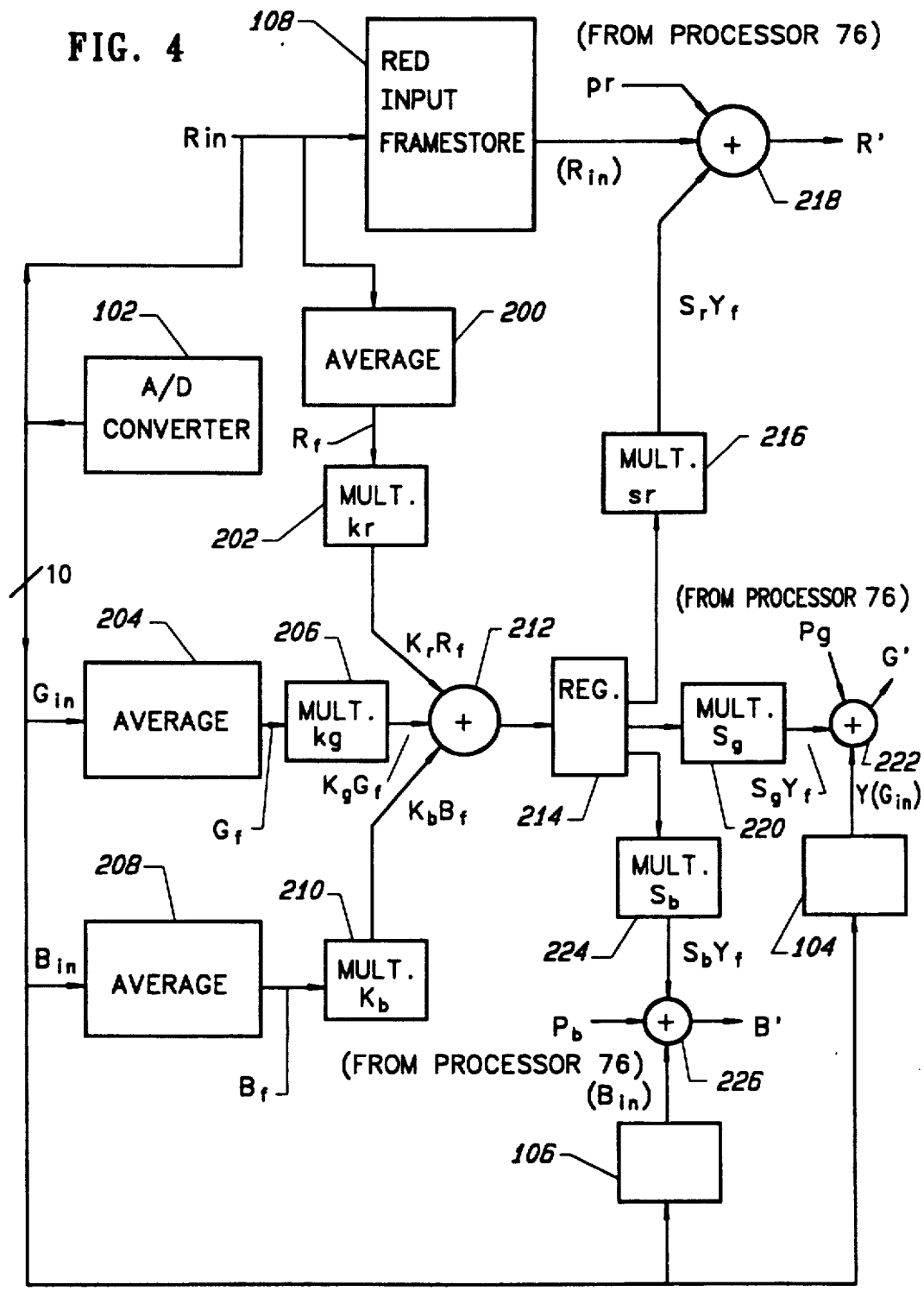
FIG. 4 is a block diagram of a preferred embodiment of the invention.

FIG. 4 is a preferred embodiment of circuitry for implementing the flare correction method of the invention. The FIG. 4 circuit is connected to A/D converter 102 and frame buffers 104, 106, and 108 of input processor 70, as shown. A/D converter 102 sequentially asserts blue digital data ("$B_{in}$"), green digital data ("$G_{in}$"), and red digital data ("$R_{in}$") at the inputs of averaging circuits 200, 204, and 208, and frame buffers 104, 106, and 108. Circuits 108 and 200 selectively receive the red data $R_{in}$ (under control of input control logic 110 shown in FIG. 3), circuits 104 and 204 selectively receive the green data $G_{in}$ (under control of input control logic 110 shown in FIG. 3), and circuits 106 and 208 selectively receive the blue data $B_{in}$ (under control of input control logic 110 shown in FIG. 3). Time delayed blue digital data ("($B_{in}$)"), time delayed green digital data ("($G_{in}$)"), and time delayed red digital data ("($R_{in}$)") read out from frame buffers 106, 104, and 108, respectively, are asserted at addition circuits 226, 222, and 218.

The data which comprise each frame of red input data, $R_{in}$, are averaged in pixel averaging circuit 200, to generate a signal, $R_f$, representing the average luminance of that frame of red input data. Similarly, the data which comprise each frame of input data $G_{in}$ and $B_{in}$ are averaged in pixel averaging circuits 204 and 208, respectively, to generate signals $G_f$ and $B_f$. Signals $G_f$ and $B_f$ represent the average luminance of frames of green and blue input data, respectively.

Signal $R_f$ is multiplied by normalizing signal $k_r$ in multiplication circuit 202. Similarly, signal $G_f$ is multiplied by normalizing signal $k_g$ in multiplication circuit 206, and signal $B_f$ is multiplied by normalizing signal $k_b$ in multiplication circuit 210, where the normalizing signals are selected to satisfy the relation $k_r + k_g + k_b = 1$.

The output signals from circuits 202, 206, and 210 are summed in addition circuit 212. Because A-to-D converter 102 generates red, green, and blue frames of data sequentially, the outputs $k_r R_f$, $k_g G_f$, and $k_b B_f$ of multiplication circuits 202, 206, and 210 are asserted sequentially at the three inputs of addition circuit 212. Upon assertion at addition circuit 212 of the final one of a set of three consecutive signals $k_r R_f$, $k_g G_f$ and $k_b B_f$, circuit 212 sums the three signals to generate signal $Y_f = k_r R_f + k_g G_f + k_b B_f$, which represents the average luminance of a single color video frame.

The output $Y_f$ of adder 212 is supplied through register 214 to multiplication circuits 216, 220, and 224. Signal $Y_f$ is multiplied by red flare correction factor $s_r$ in multiplication circuit 216, by green flare correction factor $s_g$ in multiplication circuit 220, and by blue flare correction factor $s_b$ in multiplication circuit 224.

The red, green, and blue flare correction factors, $s_r$, $s_g$, and $s_b$, are pre-selected constants. Typically, the magnitude of each is fractional.

The preferred embodiment of the inventive apparatus shown in FIG. 4 also requires predetermined red, green, and blue lift correction signals $p_r$, $p_g$, and $p_b$. These lift correction signals, supplied from computer 18 via control processor 76, are constants that have been pre-selected to achieve a desired balance between the system's red, green, and blue data channels.

Thus, within each of the red, green, and blue data channels in the FIG. 4 circuit, both flare correction and lift correction are performed simultaneously at addition circuits 218, 222, and 226.

At addition circuit 218, for each of the delayed red pixels ($R_{in}$) of the current frame of data (as these pixels are read from frame buffer 108), output $s_r Y_f$ of multiplication circuit 216 is summed with the pixel itself output from buffer 108 and the red lift correction factor $p_r$. Similarly, at addition circuit 222, the output $s_g Y_f$ of multiplication circuit 220 is summed with the green lift correction factor $p_g$ and with each delayed green pixel ($G_{in}$), as these delayed pixels are read from frame buffer 104. Also similarly, at addition circuit 226, the output $s_b Y_f$ of multiplication circuit 224 is summed with a blue lift correction factor $p_b$ and with each delayed blue pixel ($B_{in}$), as these delayed pixels are read from frame buffer 106. As explained above, since red, green, and blue pixels are output simultaneously from frame buffers 104, 106, and 108, correction within each color channel is performed simultaneously in addition circuits 218, 222, and 226.

The outputs of multiplication circuits 216, 220, and 224 are flare correction factors, which compensate for undesired luminance variations from frame to frame within each color channel. Thus, by combining the flare correction factors with data representing a digitized color image (i.e., data stored in frame stores 104, 106, and 108), the invention compensates for deviation of the average luminance of that single color image from the overall average luminance of a sequence of digitized color images (including the single color image).

In a variation on the FIG. 4 apparatus, lift correction signals $p_r$, $p_g$, and $p_b$ are neither generated nor employed to correct the delayed digital data from frame stores 104, 106, and 108. Instead, in this variation, an addition circuit 218 sums only the two inputs ($R_{in}$) and $s_r Y_f$, addition circuit 222 sums only the two inputs ($G_{in}$) and $s_g Y_f$, and addition circuit 226 sums only the two inputs ($B_{in}$) and $s_b Y_f$.

In one class of embodiments, the input processor of the inventive system includes a means for performing shading correction on the digital output of A-to-D converter 102. The circuit of FIG. 4A and circuit 44 of FIG. 4B are examples of circuits for performing shading correction. Preferably, shading correction is performed on the data before flare correction. In order to perform shading correction, a set of black shading correction signals and a set of white shading correction signals are generated. In contrast with the flare correction signals described above with reference to FIG. 4 (i.e., the outputs of multiplication circuits 216, 220, and 224) which compensate for undesired luminance variation due to optical scatter from frame to frame within each color channel, the shading correction signals compensate for undesired luminance variation within each frame due to CCD pattern noise.

The black shading correction signals are preferably generated in the following manner. Camera processor 12 and input processor 70 are operated to generate red, green, and blue digital data collectively representing a "black" motion picture frame. This is conveniently accomplished by positioning a lens cap over the lens of the camera within unit 12, and then operating unit 12 to generate a red frame of data, a green frame of data, and a blue frame of data. The average luminance of each frame is then computed (for example, by processing the frames using averaging circuits 200, 204, and 208). Then, for each frame, the difference is computed between the luminance of each pixel of the frame, and the frame's average luminance. These difference signals (scaled by a pre-selected constant factor) are employed as "red," "green," and "blue" black shading correction signals (to be added to the corresponding red, green, and blue frames of data).

White shading correction is performed in a similar manner to black shading correction, except that the white shading correction signals generated during the process are employed as multiplicative factor signals (rather than additive correction signals) to correct the red, green, and blue data streams.

Figure 4A:
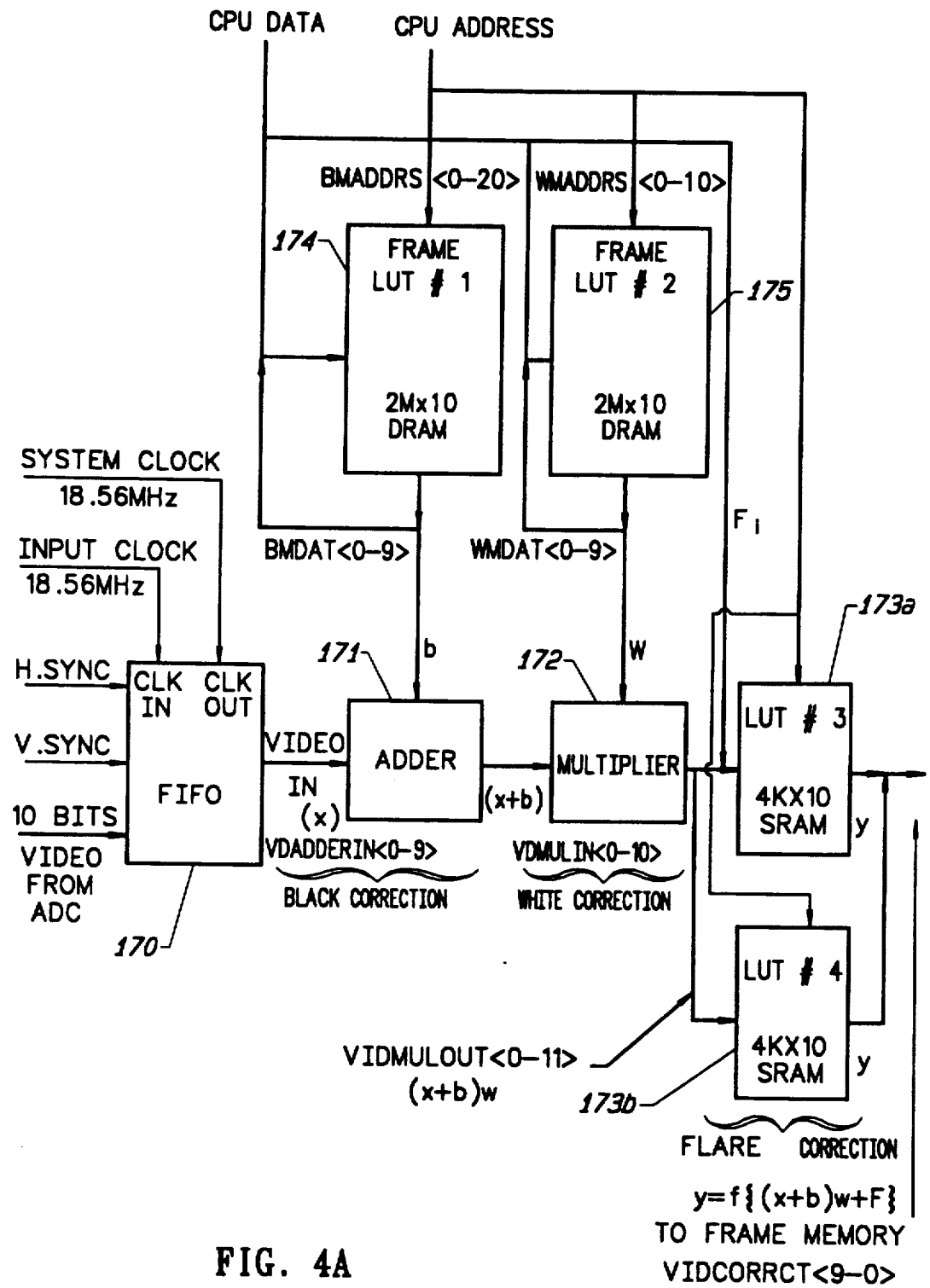
FIG. 4A is a block diagram of an alternative embodiment of the invention.
Figure 4B:
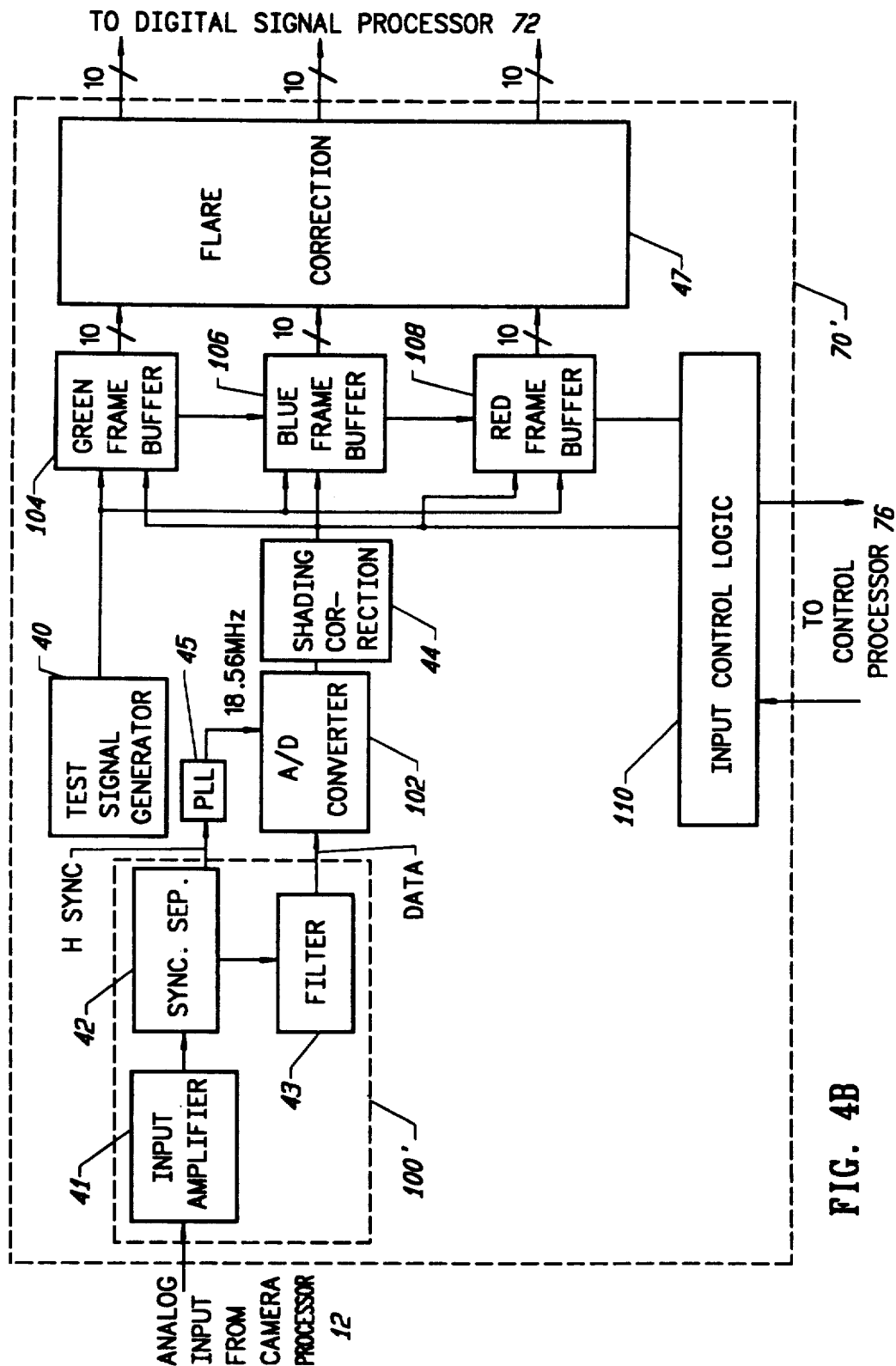
FIG. 4B is a block diagram of an alternative preferred embodiment of the input processor shown in FIG. 2.

FIG. 4A is an alternate embodiment of circuitry for implementing not only the flare correction method of the invention, but also shading correction (and optionally also lift correction). As shown in FIG. 4A, FIFO circuit 170 receives digital data from A-to-D converter 102, horizontal and vertical sync information from circuit 100 (or circuit 100' of FIG. 4B), and input clock and system clock signals from control processor 76. FIFO circuit 170 is a buffer which clocks in the data at the source rate (typically 18.56 MHz), and reads it out at the system clock rate (typically also 18.56 MHz). FIFO circuit 170 receives horizontal and vertical sync information from circuit 100 (or circuit 100') in order to create addresses for the data written therein.

After the data are read from FIFO 170, they undergo correction in correction circuits 171, 172, and 173b (or 173a), in a manner to be explained below. The corrected data asserted at the output of circuit 173b (or 173a) are written into selected ones of frame buffers 104, 106, and 108.

Correction circuits 171, 172, and 173b (or 173a) convert each red pixel ($x_r$), green pixel ($x_g$), and blue pixel ($x_b$) from FIFO 170 into a corrected pixel ($y_i$) having form $$y_i = f(x_i + b_i) w_i + F_i.$$

where f is an overall multiplicative constant, $w_i$ is a white shading correction signal for color channel i, $b_i$ is a combined black shading correction and lift correction signal for color channel i, and $F_i$ is a flare correction signal for color channel i.

Black shading correction (and optionally also lift correction) is performed in addition circuit 171, by adding to each uncorrected pixel a corresponding black shading correction signal $b_i$. The black shading signals (10-bit signals identified as "BMDAT<0-9>" in FIG. 4A) are generated in computer 18 the manner explained above. The black shading signals (and corresponding address signals "BMADDRS<0-9>") are supplied from computer 18 to look-up table 174, and are written into and read out from look-up table 174 in response to commands relayed through control processor 76 from computer 18. In addition circuit 171, the black shading signals read from table 174 are added to the data from FIFO circuit 170. In general, there is a different black correction signal $b_i$ for each of the red, green, and blue color channels. The three black shading correction signals are read out from table 174 sequentially, for sequential addition in circuit 171 with the time-domain-multiplexed RGB data output from FIFO circuit 170. Each signal $b_i$ can represent a black shading correction factor alone, or a combined black shading correction and lift correction factor.

White shading is performed in multiplication circuit 172 by multiplying the eleven-bit output "VDMULIN<0-10>" of circuit 171 by correction signal w. This correction signal (the 10-bit signal identified as "WMDAT<0-9>" in FIG. 4A) and corresponding address signals ("WMADDRS<0-9>") are supplied from computer 18 to look-up table 175, and are written into and read out from look-up table 175 in response to commands relayed through control processor 76 from computer 18. In general, there is a different correction signal $w_i$ for each of the red, green, and blue color channels. These three correction signals are read out from table 175 sequentially, for sequential multiplication in circuit 172 with the time-domain-multiplexed RGB data output from circuit 171.

Flare correction is performed on the ten most significant bits of the twelve-bit parallel data stream (identified as "VIDMULOUT<0-11>" in FIG. 4A) output from circuit 172 by transforming the data stream in one of flare correction look-up tables 173a and 173b. A flare correction signal array, $F_i$, for each color channel, i, can be written into one of look-up table 173a and 173b in response to commands relayed through control processor 76 from computer 18. Two look-up tables 173a and 173b are provided so that one table can be updated with a new signal array $F_i$ while the other processes data asserted at the output of circuit 172. To simplify the following description, we assume (as suggested in FIG. 4A) that table 173b is processing data from circuit 172, and that table 173a is being updated with a new array $F_i$ (although the roles of tables could be reversed).

In general, there is a different array $F_i$ for each of the red, green, and blue color channels. The flare correction signal arrays for the three color channels are sequentially applied by circuit 173b to the time-domain-multiplexed RGB data output from circuit 172. The ten-bit parallel corrected data stream ("VIDCORR-CT<0-9>") output from look-up table 173b is supplied to frame buffers 140, 106, and 108.

The flare correction signal arrays supplied to tables 173a and 173b from control processor 76 can be generated by the portion of the FIG. 4 circuit comprising circuits 200, 202, 204, 206, 208, 210, 212, 214, 216, 220, and 224, or by alternative circuitry.

In one embodiment, each of look-up tables 174 and 175 is a 2M × 10 bit DRAM integrated circuit, and each of look-up tables 173a and 173b is a 4K × 10 bit SRAM integrated circuit.

In one class of embodiments, each of frame buffers 104, 106, and 108 includes two memory blocks, each having 1M × 12 bit capacity. Each 1M × 12 bit block includes three commercially available 1M × 4 bit memory circuits. However, in a preferred embodiment within this class, only the ten most significant bits of the data are utilized (in the sense that each pixel read from any of buffers 104, 106, and 108, consists of ten parallel bits).

A preferred embodiment of an input processor, which can include the FIG. 4A circuitry, will next be described with reference to FIG. 4B. Input processor 70' of FIG. 4B is identical to input processor 70 of FIG. 3 except in the following respects. The analog input signal is supplied from camera processor 12 (preferably over a 75 ohm coax cable) to filter/amplifier circuit 100'. Circuit 100' includes input amplifier 41, sync separation circuit 42 for separating the horizontal sync, vertical sync, and video data portions of the input signal, and low pass filter 43 for filtering the video data portion of the input signal to reduce aliasing. In one embodiment, the cutoff frequency of low pass filter 43 is about 7.5 MHz, with the filter having a flat frequency response from 0 to 7.5 MHz, and the frequency response of the filter declining in a steep slope from 7.5 MHz to 9.3 MHz.

The amplified, low-pass-filtered analog data stream output from filter 43 is digitized in analog-to-digital conversion circuit 102. In a preferred embodiment, the H Sync signal from sync separation circuit 42 is multiplied by 2200 in phase-locked loop 45 to generate an 18.56 MHz clock signal, and this 18.56 MHz clock signal is supplied to A-to-D conversion circuit 102, wherein it is employed to sample the input analog data at a data rate of 18.56 MHz.

In one operating mode, the digital video data generated by A-to-D converter 102 are supplied directly to green frame buffer 104, blue frame buffer 106, and red frame buffer 108 at the source rate (typically, 1.875 frames per second). Blue, green, and red data are read out in parallel from buffers 104, 106, and 108 (to produce three parallel data streams, each representing a different 10-bit color channel) at four times the source rate. In order to achieve the described four-fold increase in frame rate, each bit written into one of buffers 104, 106, and 108, is read out four times from that buffer.

The circuitry described above with reference to FIG. 4A can be embodied in flare and shading correction circuit 44 (shown in FIG. 4B). In the normal operating mode of such an embodiment, the digital data from A-to-D converter 102 are supplied to circuit 44 for shading correction, lift correction, and flare correction, and the corrected red, green, and blue frames output from circuit 44 are written sequentially into frame buffers 104, 106, and 108. In another operating mode of this embodiment of input processor 70', data from test signal generator 40 (rather than correction circuit 44) are written sequentially into frame buffers 104, 106, and 108.

In embodiments of processor 70' which employ the FIG. 4 circuit for flare correction (rather than the FIG. 4A circuit), circuit 44 of FIG. 4B performs only shading correction (not flare correction), and the FIG. 4 circuit is embodied in circuit 47 of FIG. 4B. In embodiments of input processor 70' in which circuit 44 performs flare correction as well as shading correction, circuit 47 can be omitted.

Figure 5:
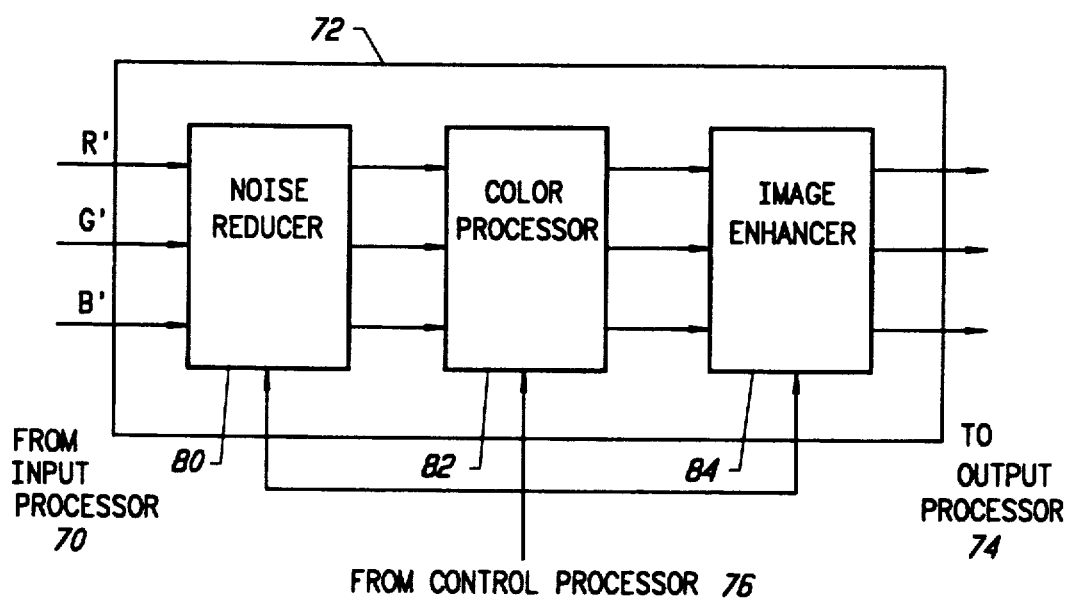
FIG. 5 is block diagram of the digital signal processor shown in FIG. 2.

With reference next to FIG. 5, digital signal processor 72 of FIG. 2 preferably includes a noise reduction circuit 80, which receives the corrected R', G', B' signal outputs of addition circuits 218, 222, and 226 of FIG. 4 (or the corrected data streams supplied, through frame buffers 104, 106, and 108, from the FIG. 4A circuit). In the case that the FIG. 4 circuit is not connected to input processor 70, noise reduction means 80 receives the R,G,B signals output directly from frame buffers 104, 106, and 108 of input processor 70. Noise reduction circuit 80 should include a circuit for reducing film noise (including film grain noise and scratches) and image pick-up system noise (including noise relating to the system's optics and image sensor, as well as associated electronic noise).

As indicated in FIG. 5, the output of noise reduction circuit 80 undergoes digital color correction in color processor 82, and then digital image enhancement in image enhancement circuit 84. Preferably, digital signal processor 72 processes the digital data at an internal processing rate substantially greater than the scanning rate of camera processor 12. For example, if the scanning rate is 1.875 fps, the internal processing rate of processor 72 may desirably be about 8 fps.

Figure 6:
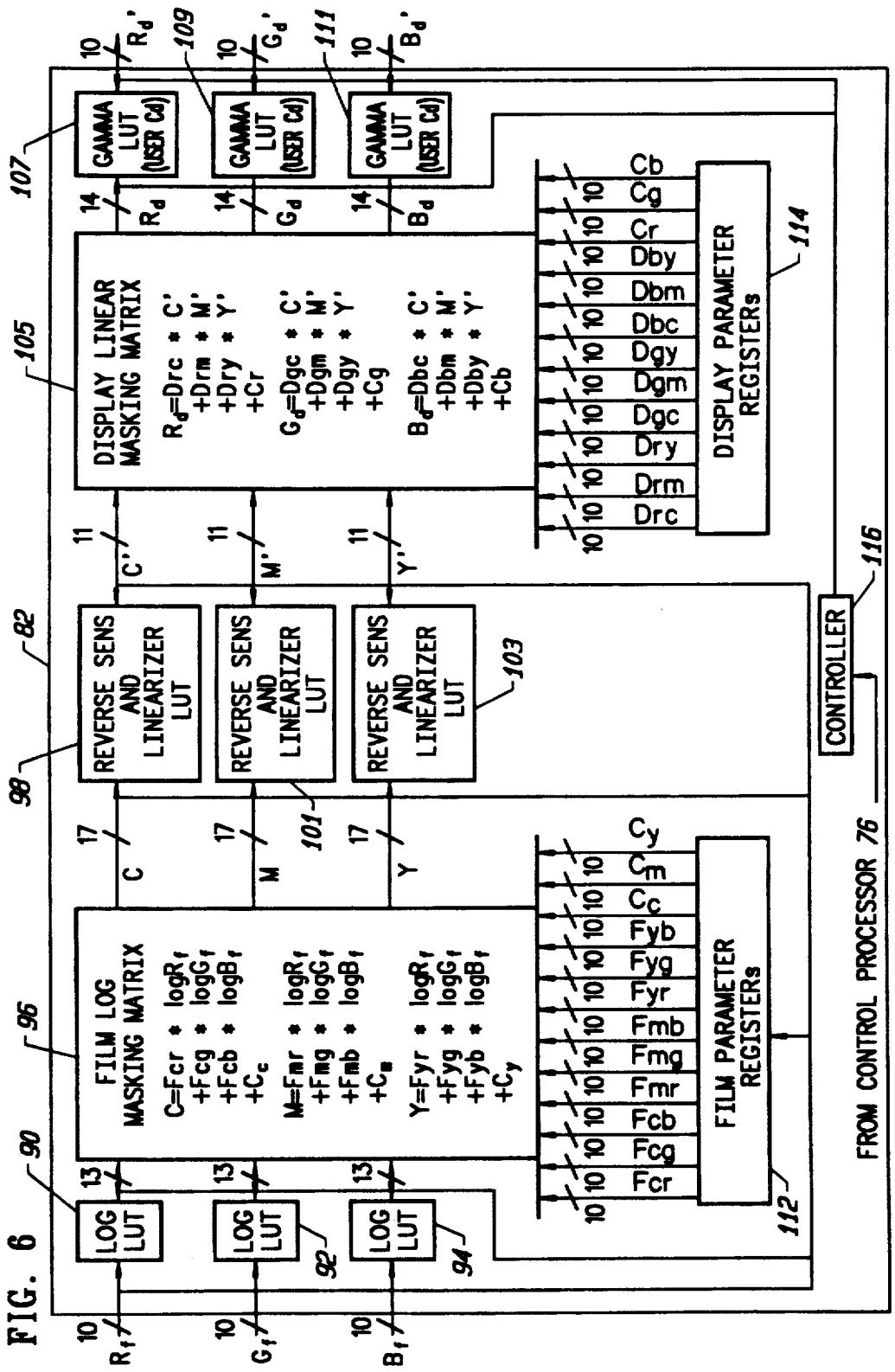
FIG. 6 is block diagram of the color processor shown in FIG. 5.

FIG. 6 is a preferred embodiment of color processor 82. The FIG. 6 apparatus is designed to perform a limited type of color transformation, namely the transformation of the colors of the digitized images generated by camera processor 14 (as a result of scanning motion picture film) into colors that would have been generated if the subject had been imaged directly by a video camera (i.e., without intermediate filming and film scanning steps). If desired, a more complicated and versatile color correction means, for example a "paint" system having the capability to perform a wide range of color transformations, may be substituted for the apparatus of FIG. 6.

The FIG. 6 apparatus includes a film transform section and a display transform section. The film transform section includes logarithm look-up tables 90, 92, and 94, masking matrix 96, parameter registers 112, and "reverse sensitometry and linearizing" look-up tables 98, 101, and 103. Display transform section includes masking matrix 105, parameter registers 114, and gamma function multiplication means 107, 109, and 111.

A logarithm operator is applied to each of the red, green, and blue 10-bit input pixels in look-up tables 90, 92, and 94, to generate a 13-bit value for each 10-bit input pixel. More particularly, logarithm look-up tables 90, 92, and 94 compute the logarithms of the red, green, and blue input pixels, by multiplying them by pre-stored log transformation parameters to generate 13-bit log domain output data.

Masking matrix 96 transforms the log domain data asserted at the outputs of look-up tables 90, 92, and 94 to correct for crosstalk between film dyes, interlayer interimage effects, and the effects of colored coupler masking as seen by camera processor 14. Masking matrix coefficients $F_{cr}$, $F_{cg}$, $F_{cb}$, $F_{mr}$, $F_{mg}$, $F_{mb}$, $F_{yr}$, $F_{yg}$, and $F_{yb}$, and parameters $C_c$, $C_m$, and $C_y$, are determined by the spectral absorption of the film dyes and the spectral sensitivity of camera processor 14's image pickup system, and are stored in registers 112 in response to control signals supplied from controller 116 (in response to control signals from control processor 76). The data pixels asserted at the outputs of masking matrix 96 are proportional to equivalent cyan, magenta, and yellow film densities, and hence are grouped into the channels labeled "C", "M", and "Y".

The equivalent dye densities are related in a well-known manner to selective film exposures by sensitometric and characteristic curves. For this reason, the "cyan" data generated in masking matrix 96 undergoes gamma correction and reverse sensitometry processing, as well as inverse-log transformation in look-up table 98. Similarly, the "magenta" data generated in masking matrix 96 undergoes gamma correction, reverse sensitometry, and inverse-log transformation in look-up table 101, and the "yellow" data generated in masking matrix 96 undergoes gamma correction, reverse sensitometry, and inverse-log transformation in look-up table 103.

Display section linear masking matrix 105 next transforms the linear domain data asserted at the outputs of look-up tables 98, 101, and 103 to compensate for the overall non-ideal spectral characteristics of the system as a whole (including the motion picture film being scanned, camera processor 14, and monitor 38). The masking matrix coefficients $D_{rc}$, $D_{rm}$, $D_{ry}$, $D_{gc}$, $D_{gm}$, $D_{gy}$, $D_{bc}$, $D_{bm}$, and $D_{by}$, and parameters $C_r$, $C_g$, and $C_b$, that are employed to process the CMY data pixels in display linear masking matrix 105 are stored in parameter registers 114.

Masking matrix coefficients $D_{rc}$, $D_{rm}$, $D_{ry}$, $D_{gc}$, $D_{gm}$, $D_{gy}$, $D_{bc}$, $D_{bm}$, $D_{by}$, $D_{cr}$, $D_{cg}$, $F_{cb}$, $F_{mr}$, $F_{mg}$, $F_{mb}$, $F_{yr}$, $F_{yg}$, and $F_{yb}$, and parameters $C_r$, $C_g$, $C_b$, $C_c$, $C_m$, and $C_y$ are preferably selected by the user in the following manner. A test frame, from a sample of motion picture film of the same type as the film to be color-corrected, is scanned. Output processor 74 generates a composite video signal (in a manner to be explained in greater detail below) by combining portions of the test frame and a comparable reference frame. Monitor 38 displays the composite signal as a split screen image (with complementary portions of the test frame and the reference frame in distinct regions of the split screen). To generate the composite signal, control processor 76 reads out the reference frame from one of frame stores 120–127 under the control of computer 18.

While viewing the test frame and the reference frame, the user selects the processing coefficients and parameters interactively (by entering commands to input device 28 in response to menus displayed on computer graphics monitor 22) to achieve a desired visual appearance of the two displayed images.

In a variation on this procedure, the user selects a set of processing coefficients and parameters for each of a number of selected motion picture film frames (preferably using different corresponding pre-stored reference frames for each selected motion picture film frame), and computer 18 downloads each selected set of coefficients and parameters through control processor 76 and controller 116 at appropriate times to registers 112 and 114. Computer 18 also automatically generates coefficients and parameters for intermediate film frames (i.e., film frames for which the user did not specifically select coefficients and parameters) by employing an interpolation technique, and downloads these interpolated coefficients and parameters (at appropriate times) to registers 112 and 114.

After the data pixels asserted at the outputs of look-up tables 98, 101, and 103, are processed in display linear masking matrix 105, they are proportional to red, green, blue HDVS high definition video pixels and hence are grouped into the channels labeled "$R_d$", "$G_d$", and "$B_d$". Each of the $R_d$, $G_d$, and $B_d$ data streams is processed in a corresponding one of gamma function multiplication circuits 107, 109, and 111, to compensate for the nonlinear characteristics of the display monitor. In one class of embodiments, each of multiplication circuits 107, 109, and 111 is implemented as a single look-up table comprising a read-only memory which stores a set of transform parameters to be applied to all input pixels in the relevant RGB channel.

However, such an implementation (employing a single look-up table for each RGB channel) may undesirably introduce aliased data components into the data which cannot practically be subsequently removed. Accordingly, we prefer to implement each of multiplication means 107, 109, and 111 as a set of N parallel look-up tables (each for applying a different term of an N-degree polynomial to the data) with a low-pass filter for pre-filtering the input data supplied to each look-up table. In this latter embodiment, the data supplied to each look-up table are pre-filtered in the corresponding filter to eliminate high frequency components of the data which would otherwise introduce aliased signal components into the output of the look-up table. Within each color channel, each low-pass filter will preferably pass a different frequency band, with the cut-off frequencies for the filters corresponding to higher-order polynomial terms exceeding the cut-off frequencies for the filters for lower-order polynomial terms.

The output of color processor 82 preferably undergoes image enhancement in image enhancement circuit 84 prior to subsequent processing in output processor 74. Image enhancement means 84 preferably performs both edge enhancement and softening. In alternative versions of digital signal processor 72 shown in FIG. 5, noise reduction means 80 or image enhancement means 84 (or both means 80 and means 84) are omitted.

Figure 7:
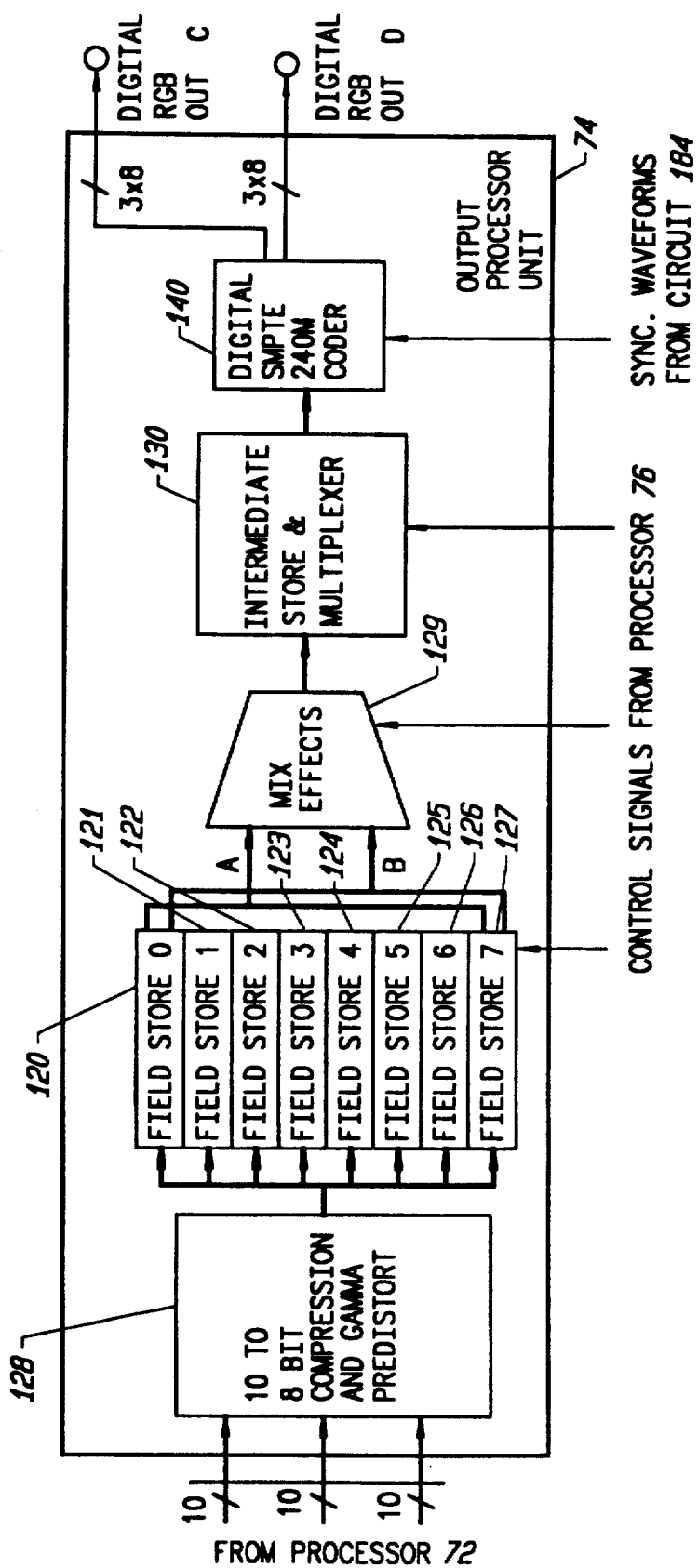
FIG. 7 is block diagram of the output processor shown in FIG. 2.

The preferred embodiment of output processor 74 shown in FIG. 7 includes compression circuit 128, which receives digitized frames of 10-bit parallel data from digital signal processor 72, and compresses the 10-bit parallel data stream into an 8-bit parallel data stream. Individual fields comprised by the 8-bit data stream are written selectively into assembly field stores 120–127 in response to control signals supplied from control processor 76 to the field stores 120–127 (only one of field stores 120–127 receives data at a time). One or more digitized reference fields (typically, at least two reference fields which comprise a reference frame) can also be written selectively from circuit 128 into selected ones of field stores 120–127.

Five of field stores 120–127 are required to perform the 3-2 pulldown scanning process to be described below. Typically, two of field stores 120-127 are employed to store reference fields which comprise a reference frame.

Compression circuit 128 optionally also includes circuitry for performing display gamma predistortion on the 8-bit parallel data before the data are written into field stores 120-127.

As indicated in FIG. 7, data may be read from any two of field stores 120-127 in parallel, to produce two 8-bit parallel digital data streams A and B (for each color channel). In one typical case, data stream A represents a color-corrected motion picture film frame from digital signal processor 72, and data stream B represents a reference video frame prestored in the field stores.

Data are written into (and read out from) field stores 120-127 in response to control signals from processor 76. In one embodiment, a 3-2 pulldown process is implemented to write data from the field stores. Such a 3-2 pulldown process typically contemplates that camera processor 12 scans a motion picture film at a frame rate of (24/N) fps, where N is an integer, as the film advances through scanner 10 at the same rate (24/N fps). In one embodiment, N=16, so that camera processor 12 generates video frames at a rate of 1.5 frames per second. In this embodiment, digital data are read from input processor frame stores 104, 106, and 108 at the rate of 6 frames per second (12 fields per second), and written into field stores 120-127 at the same rate (12 fields per second).

Circuit 128 includes means for demultiplexing each frame of data it receives into its constituent odd $f_o$ and even $f_E$ fields, so that individual even or odd fields can be selectively written into fields stores 120-127. In general, to implement the 3-2 pulldown process, individual fields are written sequentially into field stores 120-127, and different sequences of fields (including some duplicate odd $f_{OD}$ and even $f_{ED}$ fields) are read from the field stores (at a higher field rate) to produce frames of output video data. Each frame of output video data includes one odd $f_o$ and one even $f_E$ field. In one embodiment, fields are written into field stores 120-127 at the rate of 12 fields per second, and are read out from fields stores 120-127 at the rate of 15 fields per second.

For example, in response to control signals from processor 76, fields can be written from circuit 128 into selected ones of field stores 120-127 in the following sequence: during a first timing cycle, fields $F_1f_o$ and $F_1f_E$ of the first input frame $F_1$, are written into field stores 120 and 121, respectively. During the next timing cycle, the two fields comprising the second input frame $F_2$ are written into field stores 122 and 123, respectively. Similarly, during subsequent timing cycles, subsequent input frames $F_N$ are written into selected pairs of field stores 120-124, or reference fields are written into field stores 125-126.

During the first output timing cycle, fields $F_1f_o$ and $F_1f_E$ corresponding to the first input frame $F_1$ are read from field stores 120 and 121. During the second output timing cycle, the odd field from the first input frame is output again as a duplicate field $F_1f_{OD}$, along with the even field $F_2f_E$ of the second input frame $F_2$. Subsequent fields are similarly output (for example, in the sequence described in detail in the above-referenced patent application entitled "Film-to-Video Frame Image Conversion Apparatus and Method for Selectively Identifying Video Fields and Frames," by P. Capitant, D. Hodgson and V. Perry, filed May 14, 1991, Ser. No. 699,928.

Rate conversion (for example, from the rate of 12 fields per second to the rate of 15 fields per second) is thus achieved by reading out stored fields repeatedly from selected ones of stores 120-127. In one embodiment, data are read from field stores 120-127 at a rate of 60 fields per second (30 fps), and processed in circuit 129, written into circuit 130, and read out from circuit 130 at that rate (30 fps). In another embodiment, data are read from field stores 120-127 at a rate of 15 fields per second (7.5 fps), processed in circuit 129 and written into circuit 130 at the rate of 7.5 fps, but read out from circuit 130 at the rate of 30 fps.

The digital video data stream asserted at the output of circuit 129 includes "artificial" frames comprising even and odd fields from different input frames). Such artificial frames may interfere with subsequent processing of each digital video signal output from processor 74.

Digital data streams A and B from field stores 120-127 are supplied to the two inputs of "mixing and effects" circuit 129. The mix source of circuit 129 may be a constant value (to achieve a "fade" between sources A and B). Circuit 129 preferably has an onboard wipe generation circuit, and means for generating a composite video signal from data streams A and B for display as a split screen image in which a portion of the "A" image, and a complementary portion of the "B" image, occupy distinct regions of a monitor screen. The wipe generator means within circuit 129 generates rectangular wipes of any size within the output raster, may be switched on or off at any time in response to control signals from processor 76, and preferably inserts a border signal into the data stream in order to produce a distinctive displayed border which separates the two image regions of the displayed composite signal. Such a distinctive border helps the system user to distinguish a reference image from a test image, since often the test image differs only slightly and subtly from the reference image.

Circuit 129 preferably also includes means for inserting a conventional graphics cursor signal into the composite video digital signal produced by other circuitry within circuit 129. The cursor signal overlays a cursor region of the displayed video output from output processor 74. By operating the input device 28 to change the cursor signal, the user controls the position of the cursor in the displayed video image. In a preferred embodiment, when the displayed cursor highlights a region of a displayed video frame, the user can select color coefficients and parameters to match the highlighted region by entering appropriate commands using the input device 28.

The 8-bit parallel data streams (one 8-bit parallel stream for each of the R,G,B color channels) asserted at the output of circuit 129 are supplied to intermediate frame store circuit 130. The digital data from circuit 129 are written into circuit 130 at a first rate (for example, 7.5 fps) and can be read out from circuit 130 at four times the first rate (for example, 30 fps, the proposed standard SMPTE-240M digital video frame rate). In this case, each bit written into circuit 130 is read out four times from circuit 130.

Within coding circuit 140, video synchronization signal insertion circuitry inserts conventional digital blanking, sync, and vertical interval data into the horizontal and vertical blanking intervals of the digital data read out from circuit 130. The output of circuit 140 is thus a digital video signal ready for display. Preferably, the inserted sync information satisfies a standard for high definition video, so that the output of circuit 140 is a standard format high definition digital color video signal (for example, satisfying the proposed SMPTE-240M high definition digital video standard). The sync information is supplied to circuit 140 from an internal timing generator 182 within timing unit 190, which is in turn within control processor 76 (to be described below).

Preferably, coder 140 also inserts encoded "tagging" information into the video signal emerging from circuit 130. The tagging information can be a set of color correction or noise reduction parameters useful for performing subsequent color correction or noise reduction processing, or information which identifies artificial frames generated during the 3-2 pulldown process. Identification of the artificial frames in this manner enables subsequent processing systems (such as an EBR system which converts video signals to motion picture film images) to reject (or specially process) the artificial frames from the output of the FIG. 1 system.

The output of coder 140 is an 8-bit color digital video signal. Coder 140 asserts alternate frames of this digital video signal on output lines C and D, for storage, respectively, in frame stores 30 and 31 (shown in FIG. 1).

Figure 8:
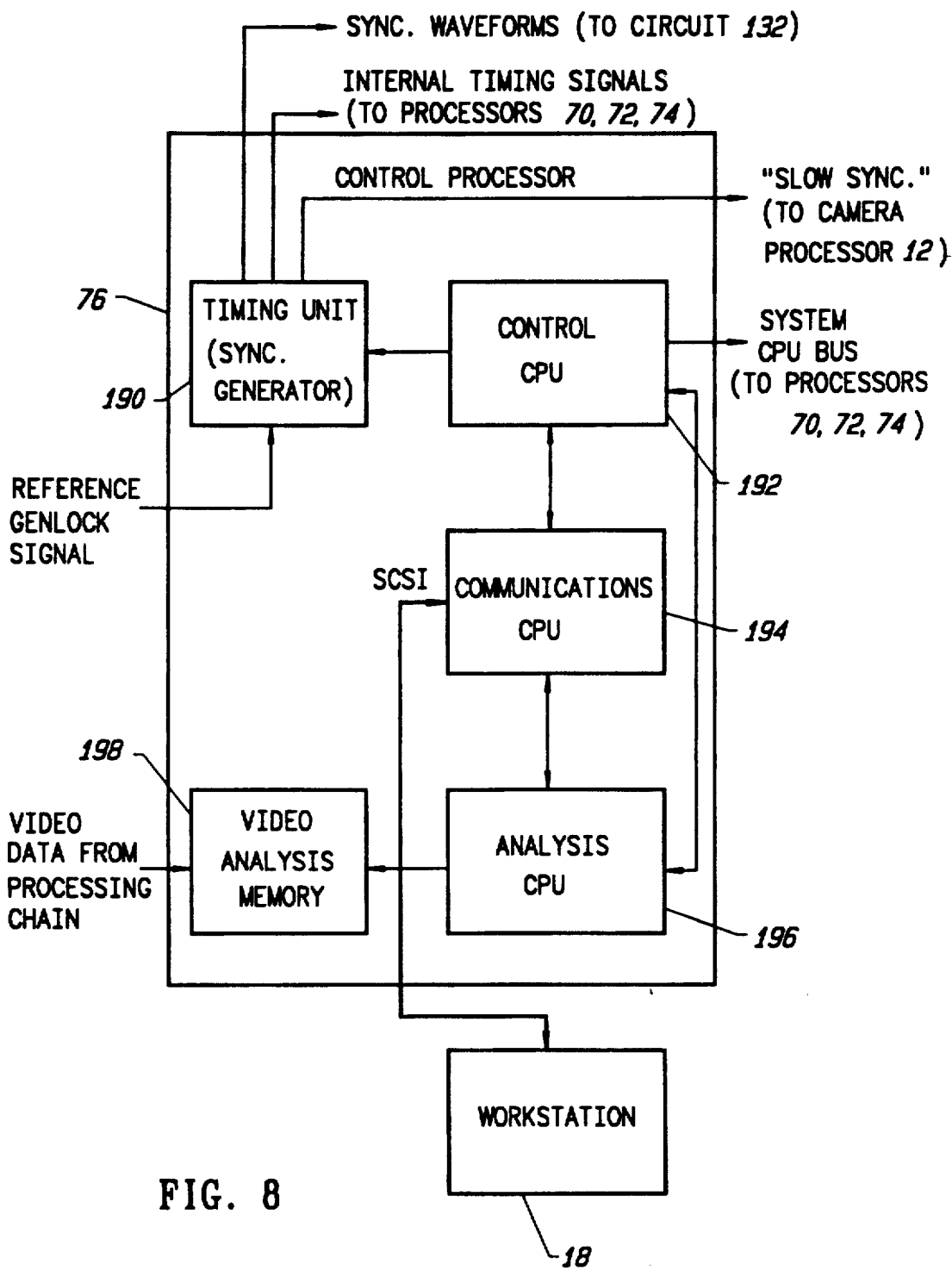
FIG. 8 is block diagram of the control processor shown in FIG. 2.

Control processor 76 of film scanning processor 14 will next be described with reference to FIG. 8. Communications CPU 194 within control processor 76 communicates with computer 18 over an SCSI interface.

Digital data being processed within film scanning processor 14 is supplied to video analysis memory 198. In response to instructions from CPU 194, a data analysis CPU 196 reads data from memory 198, analyzes the data, and sends the analysis results to CPU 194, which relays the results to computer 18.

In response to commands from CPU 194, control CPU 192 sends control signals to timing unit 190, and to the other processing boards within the film scanning processor 14 (input processor 70, digital signal processor 72, and output processor 74).

Figure 9:
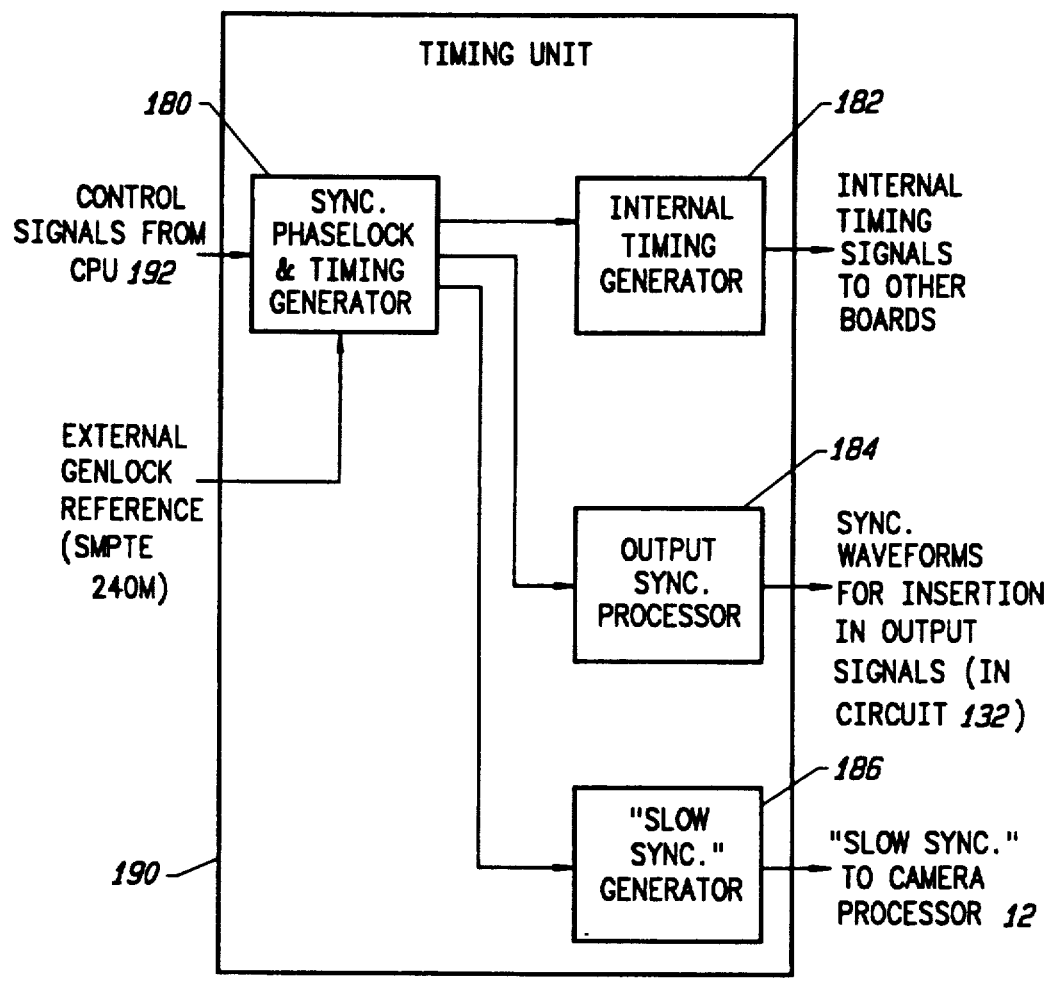
FIG. 9 is block diagram of the timing unit shown in FIG. 8.

With reference to FIG. 9, sync. phaselock and timing generator 180 within timing unit 190 receives an external genlock reference signal (preferably an SMPTE-240M genlock reference signal), so that all signals supplied from circuit 180 to the other components of timing unit 190 are phaselocked to the external genlock reference. Slow sync generator 186 generates the abovementioned low rate synchronization signal ("slow sync") for use by camera processor 12 in response to control signals from CPU 192. Output sync processor 184 generates synchronization waveforms for insertion at circuit 132 into the digital video data stream as described above, in response to control signals from CPU 192. Internal timing generator 182 generates other timing signals for use by processors 70, 72, and 74, in response to control signals from CPU 192.

Various other modifications and alterations in the structure and method of operation of this invention will be apparent to those skilled in the art without departing from the scope and spirit of this invention. Although the invention has been described in connection with specific preferred embodiments, it should be understood that the invention as claimed should not be unduly limited to such specific embodiments.

What is claimed is:

1. A system for digitally performing flare correction in digital data signals representing digitized color film images, wherein the digital data signals have an overall average luminance, including:

a luminance signal generation means, for processing a first digital data signal having a first average luminance to generate a first luminance signal indicative of the first average luminance;
a means for generating flare correction signals from the first luminance signal; and
a correction means for combining the flare correction signals with the first digital data signal, to compensate for deviation of the first average luminance from the overall average luminance.

2. The system of claim 1, wherein the first digital signal comprises a red data stream, a blue data stream, and a green data stream, and wherein the luminance signal generation means includes:

means for generating a red luminance signal representing the average luminance of the red data stream;
means for generating a green luminance signal representing the average luminance of the green data stream;
means for generating a blue luminance signal representing the average luminance of the blue data stream; and
means for generating the first luminance signal from the red luminance signal, the green luminance signal, and the blue luminance signal.

3. The system of claim 2, wherein each of the red data stream, the blue data stream, and the green data stream includes pixels, wherein the flare correction signals include a red correction signal, a green correction signal, and a blue correction signal, and wherein the correction means includes:

means for adding the red correction signal to each of the pixels of the red data stream;
means for adding the green correction signal to each of the pixels of the green data stream; and
means for adding the blue correction signal to each of the pixels of the blue data stream.

4. The system of claim 1, wherein the first digital signal comprises a red data stream, a blue data stream, and a green data stream, and also including:

a means for generating a red lift correction signal, a blue lift correction signal, and a green lift correction signal;
wherein the correction means receives the red lift correction signal, the blue lift correction signal, and the green lift correction signal, and wherein the correction means includes:
means for combining the red lift correction signal with the red data stream;
means for combining the green lift correction signal with the green data stream; and
means for combining the blue lift correction signal with the blue data stream.

5. A film scanning system, including:

scanning means for scanning motion picture film to generate a digital data signal, wherein the digital data signal represents digitized color film frames having an overall average luminance, and wherein the digital data signal consists of frame signals each representing an average luminance;
means for generating a set of flare correction signals for each of the frame signals;
flare correction means for receiving the frame signals and the flare correction signals, and generating a flare corrected data signal by combining each of the frame signals with the set of flare correction signals therefor to compensate for deviation of the average luminance represented by said each of the frame signals from the overall average luminance; and a set of frame buffers for receiving the flare corrected data signal at a source rate.

6. The system of claim 5, also including:

a shading correction means connected between the scanning means and the flare correction means for receiving the frame signals and performing shading correction on the frame signals by combining each of the frame signals with a set of shading correction signals therefor.

7. The system of claim 6, wherein each of the frame signals consists of pixels, and wherein the shading correction means includes:

a look-up table for storing black shading correction signals; and an addition circuit for adding to each of the pixels a selected one of the black shading correction signals supplied from the look-up table.

8. The system of claim 7, wherein the shading correction means also includes:

a second look-up table for storing white shading correction signals; and a multiplier for multiplying each of the pixels of the frame signals by a selected one of the white shading correction signals supplied from the second look-up table.

9. The system of claim 8, wherein each of the white shading correction signals includes a lift correction component, and wherein multiplication of each of the pixels by the white shading correction signals in the multiplier accomplishes lift correction on the frame signals.

10. A film scanning system, including:

film scanning means for scanning motion picture film frames to generate digital data signals, wherein each of the digital data signals represents a digitized color film frame, wherein the digital data signals represent an overall average luminance, and wherein each of the digital data signals represents an average luminance;

luminance signal generation means for processing the digital data signals sequentially, to generate luminance signals, wherein each of the luminance signals is indicative of the average luminance represented by a different one of the data signals;

means for generating a set of flare correction signals from each of the luminance signals;

correction means for generating a flare corrected data signal from each of the digital data signals by combining said each of the digital data signals with the set of flare correction signals generated therefrom, to compensate for deviation of the average luminance represented by said each of the digital data signals from the overall average luminance; and video synchronization signal insertion means for generating a digital video signal from the flare corrected data signals.

11. The system of claim 10, wherein each of the data signals comprises a red data stream, a blue data stream, and a green data stream, and wherein the luminance signal generation means includes:

means for generating a red luminance signal for each of the red data streams, representing the average luminance of said each of the red data streams;

means for generating a green luminance signal for each of the green data streams, representing the average luminance of said each of the green data streams;

means for generating a blue luminance signal for each of the blue data streams, representing the average luminance of said each of the blue data streams; and means for generating the luminance signal for each of the data signals by combining the red luminance signal, the green luminance signal, and the blue luminance signal therefor.

12. The system of claim 11, wherein each of the red data stream, the blue data stream, and the green data stream includes pixels, wherein the set of flare correction signals include a red correction signal, a green correction signal, and a blue correction signal, and wherein the correction means includes:

means for adding the red correction signal to each red data stream pixel;

means for adding the green correction signal to each green data stream pixel; and means for adding the blue correction signal to each blue data stream pixel.

13. The system of claim 10, wherein each of the data signals comprises a red data stream, a blue data stream, and a green data stream, and also including:

a means for generating a red lift correction signal, a blue lift correction signal, and a green lift correction signal;

wherein the correction means receives the red lift correction signal, the blue lift correction signal, and the green lift correction signal, and wherein the correction means includes:

means for combining the red lift correction signal with the red data stream;

means for combining the green lift correction signal with the green data stream; and means for combining the blue lift correction signal with the blue data stream.

14. The system of claim 10, also including:

color correction means, connected between the correction means and the video synchronization signal insertion means, for generating color corrected data signals from the flare corrected data signals; and wherein the video synchronization signal insertion means generates said digital video signal from the color corrected data signals.

15. The system of claim 14, wherein the video synchronization signal insertion means generates a high definition digital video signal from the flare corrected data signals.

16. A method for digitally performing flare correction on digital data signals representing digitized color film images, wherein the digital data signals have an overall average luminance, including the steps of:

(a) processing a first digital data signal having a first average luminance to generate a first luminance signal indicative of the first average luminance;

(b) generating flare correction signals from the first luminance signal; and (c) combining the flare correction signals with the first digital data signal to compensate for deviation of the first average luminance from the overall average luminance.

17. The method of claim 16, wherein the first digital signal comprises a red data stream, a blue data stream, and a green data stream, and wherein step (a) includes the steps of:

generating a red luminance signal representing the average luminance of the red data stream;

generating a green luminance signal representing the average luminance of the green data stream;

generating a blue luminance signal representing the average luminance of the blue data stream; and generating the first luminance signal from the red luminance signal, the green luminance signal, and the blue luminance signal.

18. The method of claim 17, wherein each of the red data stream, the blue data stream, and the green data stream includes pixels, wherein the flare correction signals include a red correction signal, a green correction signal, and a blue correction signal, and wherein step (c) includes the steps of:

adding the red correction signal to the pixels of the red data stream;

adding the green correction signal to the pixels of the green data stream; and adding the blue correction signal to the pixels of the blue data stream.

19. The method of claim 18, also including the steps of:

multiplying the pixels of the red data stream with a red lift correction signal;

multiplying the pixels of the green data stream with a green lift correction signal; and multiplying the pixels of the blue data stream with a blue lift correction signal.

20. A film scanning method, including the steps of:

scanning motion picture film to generate a digital data signal, wherein the digital data signal represents digitized color film frames having an overall average luminance, and wherein the digital data signal consists of frame signals each representing an average luminance;

generating a flare corrected data signal by combining each of the frame signals with a set of flare correction signals therefor, to compensate for deviation of the average luminance represented by said each of the frame signals from the overall average luminance; and writing the flare corrected data signal into a set of frame buffers at a source rate.

21. The method of claim 20, also including the steps of:

performing lift correction on the frame signals before generating the flare corrected data signal, by combining each of the frame signals with a lift correction signal therefor.

22. The method of claim 21, also including the steps of:

performing shading correction on the frame signals before performing lift correction thereon, by combining each of the frame signals with a set of shading correction signals therefor.

23. A film scanning method, including the steps of:

(a) scanning motion picture film frames to generate digital data signals, wherein each of the digital data signals represents a digitized color film frame, wherein the digital data signals represent an overall average luminance, and wherein each of the digital data signals represents an average luminance;

(b) processing the digital data signals sequentially to generate luminance signals, wherein each of the luminance signals is indicative of the average luminance represented by a different one of the data signals;

(c) generating a set of flare correction signals from each of the luminance signals;

(d) generating a flare corrected data signal from each of the digital data signals by combining said each of the digital data signals with the set of flare correction signals generated therefrom, to compensate for deviation of the average luminance represented by said each of the digital data signals from the overall average luminance; and (e) generating a digital video signal from the flare corrected data signals.

24. The method of claim 23, wherein each of the data signals comprises a red data stream, a blue data stream, and a green data stream, and wherein step (b) includes the steps of:

generating a red luminance signal for each of the red data streams, representing the average luminance of said each of the red data streams;

generating a green luminance signal for each of the green data streams, representing the average luminance of said each of the green data streams;

generating a blue luminance signal for each of the blue data streams, representing the average luminance of said each of the blue data streams; and generating the luminance signal for each of the data signals by combining the red luminance signal, the green luminance signal, and the blue luminance signal therefor.

25. The method of claim 24, wherein each of the red data stream, the blue data stream, and the green data stream includes pixels, wherein the set of flare correction signals include a red correction signal, a green correction signal, and a blue correction signal, and wherein step (d) includes the steps of:

adding the red correction signal to each red data stream pixel;

adding the green correction signal to each green data stream pixel; and adding the blue correction signal to each blue data stream pixel.

26. The method of claim 25, wherein each of the data signals comprises a red data stream, a blue data stream, and a green data stream, and also including the steps of:

generating a red lift correction signal, a blue lift correction signal, and a green lift correction signal;

combining the red lift correction signal with the red data stream;

combining the green lift correction signal with the green data stream; and combining the blue lift correction signal with the blue data stream.

27. The method of claim 23, also including the step of:

generating a digital video signal from the flare corrected data signals.

28. The method of claim 23, also including the steps of:

generating color corrected data signals from the flare corrected data signals; and generating a digital video signal from the color corrected data signals.

* * * * *